United States Patent
Breisinger et al.

(10) Patent No.: US 11,794,579 B2
(45) Date of Patent: Oct. 24, 2023

(54) DRIVING SYSTEM FOR AUTOMATED DRIVING WITH A STEERING WHEEL DISPLAY

(71) Applicant: Bayerische Motoren Werke Aktiengesellschaft, Munich (DE)

(72) Inventors: Marc Breisinger, Munich (DE); Julian Eichhorn, Menlo Park, CA (US); Philipp Kerschbaum, Munich (DE); Lutz Lorenz, Munich (DE); Stephan Mueller, Munich (DE); Julia Niemann, Berlin (DE); Philipp Suessenguth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 825 days.

(21) Appl. No.: 16/585,064

(22) Filed: Sep. 27, 2019

(65) Prior Publication Data

US 2020/0023830 A1    Jan. 23, 2020

Related U.S. Application Data

(63) Continuation of application No. PCT/EP2018/054869, filed on Feb. 28, 2018.

(30) Foreign Application Priority Data

Mar. 28, 2017   (DE) .................... 10 2017 205 260.0

(51) Int. Cl.
*B60K 35/00* (2006.01)
*B60Q 3/283* (2017.01)
(Continued)

(52) U.S. Cl.
CPC .............. *B60K 35/00* (2013.01); *B60Q 3/283* (2017.02); *B60W 10/20* (2013.01); *B60W 30/12* (2013.01);
(Continued)

(58) Field of Classification Search
CPC ...... B60K 35/00; B60Q 3/283; G05D 1/0061; B60W 30/12; B60W 50/08
See application file for complete search history.

(56) References Cited

U.S. PATENT DOCUMENTS 8,352,110 B1 * 1/2013 Szybalski ............. B60W 10/04
                                                                   701/41
8,823,530 B2 * 9/2014 Green ................... B60K 28/06
                                                                   340/576

(Continued)

FOREIGN PATENT DOCUMENTS

CN     101638072 A    2/2010
CN     102753417 A   10/2012
(Continued)

OTHER PUBLICATIONS

International Search Report (PCT/ISA/210) issued in PCT Application No. PCT/EP2018/054869 dated May 14, 2018 with English translation (four (4) pages).

(Continued)

*Primary Examiner* — Khoi H Tran
*Assistant Examiner* — Rodney P King
(74) *Attorney, Agent, or Firm* — Crowell & Morning LLP

(57) ABSTRACT

A driving system is operatable at least in a first automated driving mode with automated longitudinal and/or lateral control, and in a different second automated driving mode with automated longitudinal and/or lateral control. The driving system has a steering wheel display with luminous elements for illuminating the steering wheel, which can be operated in different illumination states that are distinguishable by the driver. The luminous elements may illuminate the steering wheel rim, and are typically integrated into the steering wheel rim. The driving system specifies which illumination state of the different illumination states the steering wheel display has. The driving system specifies (Continued)

that, during operation of the driving system in the first driving mode, the steering wheel display is illuminated in a first illumination state. During operation of the driving system in the second driving mode, the steering wheel display is illuminated in a second illumination state that can be distinguished from the first illumination state by the driver.

4 Claims, 3 Drawing Sheets

(51) Int. Cl.
*B60W 10/20* (2006.01)
*B60W 30/12* (2020.01)
*B60W 50/08* (2020.01)
*G05D 1/00* (2006.01)

(52) U.S. Cl.
CPC ........... *B60W 50/08* (2013.01); *G05D 1/0061* (2013.01); *B60K 2370/1537* (2019.05); *B60K 2370/167* (2019.05); *B60K 2370/172* (2019.05); *B60K 2370/175* (2019.05); *B60K 2370/193* (2019.05); *B60K 2370/332* (2019.05); *B60K 2370/338* (2019.05)

(56) References Cited

U.S. PATENT DOCUMENTS

| | | | |
|---|---|---|---|
| 9,045,078 B2* | 6/2015 | Tovar | B62D 1/046 |
| 9,567,008 B2* | 2/2017 | Eichhorn | B62D 15/025 |
| 9,669,871 B2* | 6/2017 | Kuoch | B60K 35/00 |
| 10,086,753 B2* | 10/2018 | Ebina | B62D 1/06 |
| 10,717,437 B2* | 7/2020 | Uchida | B60W 40/09 |
| 2012/0277947 A1 | 11/2012 | Boehringer et al. | |
| 2014/0328077 A1 | 11/2014 | Tovar et al. | |
| 2015/0032322 A1 | 1/2015 | Wimmer et al. | |
| 2016/0185387 A1 | 6/2016 | Kuoch | |
| 2016/0257248 A1* | 9/2016 | Lisseman | B60K 35/00 |
| 2016/0280234 A1 | 9/2016 | Reilhac | |
| 2018/0319332 A1 | 11/2018 | Ebina | |

FOREIGN PATENT DOCUMENTS

| | | |
|---|---|---|
| CN | 103764482 A | 4/2014 |
| CN | 104245392 A | 12/2014 |
| CN | 105593104 A | 5/2016 |
| CN | 106132807 A | 11/2016 |
| DE | 10 2007 052 258 A1 | 6/2008 |
| DE | 10 2007 029 594 A1 | 1/2009 |
| DE | 10 2008 035 105 A1 | 12/2009 |
| DE | 10 2009 028 647 A1 | 2/2011 |
| DE | 10 2012 005 882 A1 | 11/2012 |
| DE | 10 2011 112 134 A1 | 3/2013 |
| DE | 10 2013 012 779 A1 | 2/2015 |
| DE | 10 2014 118 956 A1 | 6/2016 |
| DE | 10 2014 118 958 A1 | 6/2016 |
| DE | 10 2015 016 056 A1 | 6/2016 |
| DE | 10 2015 204 591 A1 | 9/2016 |

OTHER PUBLICATIONS

German-language Written Opinion (PCT/ISA/237) issued in PCT Application No. PCT/EP2018/054869 dated May 14, 2018 (six (6) pages).

German-language Search Report issued in counterpart German Application No. 102017205260.0 dated Oct. 27, 2017 with partial English translation (17 pages).

German-language Office Action issued in European Application No. 18 709 308.3 dated Oct. 1, 2021 (six (6) pages).

Lapoehn Stephan et al: "Concept of controlling the usage of nomadic devices in highly automated vehicles", IET Intelligent Transport Systems, the Institution of Engineering and Technology, Michael Faraday House, Six Hills Way, Stevenage, Herts. SG1 2AY, UK, Bd. 9, Nr. 6, Aug. 1, 2015 (Aug. 1, 2015), Seiten 599-605, XP006053143, ISSN: 1751-956X, DOI: 10.1049/IET-ITS.2014. 0208 (seven (7) pages).

Chinese-language Office Action issued in Chinese Application No. 201880015170.3 dated Jan. 19, 2022 with English translation (19 pages).

Chinese-language Office Action issued in Chinese Application No. 201880015170.3 dated Jul. 12, 2022 with English translation (18 pages).

* cited by examiner

DRIVING SYSTEM FOR AUTOMATED DRIVING WITH A STEERING WHEEL DISPLAY

CROSS REFERENCE TO RELATED APPLICATIONS

This application is a continuation of PCT International Application No. PCT/EP2018/054869, filed Feb. 28, 2018, which claims priority under 35 U.S.C. § 119 from German Patent Application No. 10 2017 205 260.0, filed Mar. 28, 2017, the entire disclosures of which are herein expressly incorporated by reference.

BACKGROUND AND SUMMARY OF THE INVENTION

The invention relates to a driving system for automated driving comprising a steering wheel display and to a display method for such a driving system.

In a driving system for automated or autonomous driving having automated longitudinal and lateral control, various driving modes having differing degrees of automation are frequently selectable. Exemplary degrees of automation are assisted, partially-automated, highly-automated, or fully-automated driving. These degrees of automation correspond, for example, to the definition of the German Federal Highway Research Institute (BASt) (see BASt publication "Forschung kompakt [research summary]", November 2012 issue). For example, an assisted driving mode can frequently be selected, in which the driver continuously executes the lateral control (i.e., the steering of the vehicle), while the system takes over the longitudinal control (for example, the acceleration) of the vehicle within certain limits. During operation of a driving system in a partially-automated driving mode, the system takes over the longitudinal and lateral control for a certain period of time and/or in specific situations, wherein the driver has to continuously monitor the system as in the case of assisted driving. A differentiation can be made in this case between a partially-automated hands-on driving mode, in which the driver has to keep one or both hands on the steering wheel for safety reasons, and a partially-automated hands-off driving mode, in which the driver can also take the hands away from the steering wheel. For example, a switchover is made by the system in specific situations from the partially-automated hands-off driving mode into the partially-automated hands-on driving mode. During operation of the driving system in a highly-automated or fully-automated driving mode, the system takes over the longitudinal and lateral control without the driver having to continuously monitor the system. However, during the highly-automated driving, the driver has to be capable within a certain time of taking over the vehicle control after the vehicle has requested the driver to do this by way of a takeover request. During the fully-automated driving, the system can automatically manage the driving in all situations for a specific application; a driver is no longer required for this application. The above-mentioned four degrees of automation correspond to SAE levels 1 to 4 of the norm SAE J3016 (SAE—Society of Automotive Engineering). For example, highly-automated driving (HAF) corresponds to level 3 of the norm SAE J3016. Furthermore, SAE level 5 is provided as the highest degree of automation in SAE J3016, which is not included in the definition of the BASt. SAE level 5 corresponds to driverless driving, in which the system can manage all situations automatically like a human driver during the entire journey; a driver is generally no longer required.

The respective automation status with respect to the longitudinal and lateral control of the presently provided driving mode is frequently displayed in known driving systems for automated driving via status lights, graphic representations, and/or text in the instrument cluster and/or in the HUD (HUD—head-up display). Status lights are sometimes also used on the operating element for the driving mode selection (for example, button), to indicate the automation state with respect to longitudinal and lateral control. Takeover requests or the request to place the hands on the steering wheel (for example, in the case of a traffic jam assistant) are generally also displayed in the instrument cluster or HUD. In addition, using the transmission gear selector switch to select an automated driving mode and signal the active driving mode is known (see, for example, DE 10 2007 029 594 A1).

When a vehicle drives in a highly-automated manner, the driver perceives the lateral control in addition to the vehicle-dynamics acceleration, since the steering wheel rotates automatically depending on the driving situation and the driver sees the automated steering angle setting.

The automation status is frequently not displayed on the predominantly perceived location of the automation (steering wheel) in known driving systems, but rather remotely therefrom on the instrument cluster. This is not ideal from logical and design aspects.

Takeover requests and/or the request to place the hands on the steering wheel are predominantly not displayed at the location at which the driver is supposed to be active (i.e., steering wheel), but rather also remotely therefrom (i.e., in the instrument cluster or in the HUD). This is also not ideal in the meaning of the operating logic and the reaction speed of the driver.

A steering wheel is already known from the document DE 10 2011 112 134 A1, the steering wheel rim of which has light sources. Upon activation of the autonomous driving mode of the vehicle, the light sources of the steering wheel rim are activated.

Furthermore, the document DE 10 2013 012 779 A1 describes the use of a curved lighting unit in the steering wheel rim for the optical signaling of the activation of an automatic driving mode and for the optical signaling of a takeover request. After the activation of the autonomous driving mode, the steering wheel rim lights up green, for example. Upon transition into the manual driving mode, the steering wheel rim firstly still lights up green and flashes at the same time. If a takeover does not subsequently take place, the steering wheel rim lights up red. After the driver takeover, the steering wheel rim lights up blue.

Signaling the state of the lateral control via a light ring on the steering wheel is known from the document DE 10 2007 052 258 A1. With deactivated lateral control, the light ring lights up red. In the readiness state, the light ring lights up in a yellow color, for example. Upon the transition from the deactivated state of the lateral control into the activated state, the light ring changes to the color green. Upon a takeover request, the light ring flashes in a red color.

It is an object of the invention to provide an automated driving system having an intuitive driver display for displaying information relating to the automation, which assists various driving modes of the automation. It is furthermore an object of the invention to provide a corresponding display method for a driving system for automated driving.

The object is achieved by the features of the independent patent claims. Advantageous embodiments are described in the dependent claims. It is to be noted that additional features of a patent claim dependent on an independent patent claim can form a separate invention independent of the combination of all features of the independent patent claim without the features of the independent patent claim or in combination with only a subset of the features of the independent patent claim, which invention can be made the subject matter of an independent claim, a divisional application, or a subsequent application. For example, independently of the signaling of the driving mode, the steering wheel display can be used for a hands-on request, or can be used to display whether the hands are on the steering wheel or not in the partially-automated hands-on driving mode.

A first aspect of the invention relates to a driving system for automated driving for a motor vehicle, wherein the driving system comprises a steering wheel display.

The driving system can be operated at least in a first automated driving mode having automated longitudinal and/or lateral control and in a second automated driving mode different therefrom having automated longitudinal and/or lateral control. These are preferably two different driving modes having automated longitudinal and lateral control. The two driving modes differ, for example, with respect to the degree of automation thereof. The two driving modes correspond, for example, to a partially-automated driving mode, which permits the temporary or continuous removal of the hands from the steering wheel, and a highly-automated driving mode, which permits the continuous motor and cognitive abandonment of the driving action and the corresponding operating elements.

The first driving mode and the second driving mode correspond, for example, to two different driving modes assisted by the driving system from a group of three driving modes described hereafter. The group comprises:
  a partially-automated hands-on driving mode having automated longitudinal and lateral control, in which the driver both has to continuously monitor the system and also has to keep one or two hands on the steering wheel,
  a partially-automated hands-off driving mode having automated longitudinal and lateral control, in which the driver has to continuously monitor the system, but does not have to keep a hand on the steering wheel, and
  a highly-automated or fully-automated hands-off driving mode having automated longitudinal and lateral control, in which the driver does not have to continuously monitor the system and also does not have to keep a hand on the steering wheel.

In this case, the driving system can only assist two different or even all of the three different driving modes of the above-described group of driving modes.

For example, the driving system comprises a partially-automated hands-off driving mode or a highly-automated or fully-automated hands-off driving mode as the first driving mode and a partially-automated hands-on driving mode as the second driving mode.

In another example, the driving system comprises a highly-automated or fully-automated hands-off driving mode as the first driving mode and a partially-automated hands-off driving mode or a partially-automated hands-on driving mode as the second driving mode.

It can also be that the first or second driving mode is an assisted driving mode, in which the system solely takes over the longitudinal control of the vehicle. It would also be conceivable that the first or second driving mode is a driving mode in which the system takes over the lateral control of the vehicle, while in contrast the driver controls the longitudinal control of the vehicle themself.

The driving system comprises a steering wheel display having lighting means for lighting up the steering wheel, which is operable in various lighting states differentiable by the driver. Lighting states can differ, for example, with respect to one or more of the following aspects:
  the light color thereof (for example, green, blue, red),
  the lighted area thereof (for example, a completely lighted light ring in the steering wheel rim in comparison to regions lighting up only in partial regions of the light ring, for example only on the left and right on the steering wheel rim; variable lighted areas would also be conceivable in the case of a steering wheel display in the steering wheel spokes or in the steering wheel hub),
  steady light or flashing light,
  the light intensity thereof (for example, bright light and minimal light), and
  the light pattern thereof (for example, every LED of a light ring lights up, in contrast to a light ring in which only every second LED lights up along the circumference).

The lighting means of the steering wheel display are integrated, for example, into the steering wheel spokes or into the steering wheel hub, to illuminate the steering wheel spokes or the steering wheel hub, respectively. However, these are preferably lighting means for lighting up the steering wheel rim, which are typically integrated into the steering wheel rim. Of course, the steering wheel rim could also be illuminated by lighting means arranged outside the steering wheel rim and thus caused to light up.

The driving system specifies which lighting state of the various lighting states the steering wheel display is to have. The driving system specifies that, during operation of the driving system in the first driving mode, the steering wheel display lights up in a first lighting state. During operation of the driving system in the second driving mode, the steering wheel display lights up in a second lighting state differentiable by the driver from the first lighting state. In this case, the first lighting state and the second lighting state can be continuously maintained during the operation of the driving system in the first driving mode and/or the second driving mode. Alternatively, it would also be conceivable that the first and/or second lighting state is only maintained for a limited duration after switching over into the first driving mode or second driving mode, respectively, and the steering wheel display is off thereafter, for example.

The first and the second driving modes can be reliably differentiated by the driver during the respective activation by the various lighting states of the steering wheel display, specifically at a point in the vehicle (i.e., on the steering wheel), at which the driver primarily perceives the automation of the driving operation. This type of signaling to the driver is particularly intuitive if the driver also performs the activation of an automated driving mode on the steering wheel, for example by way of multiple steering wheel buttons or a sliding operating element on the steering wheel.

In a first example, the first driving mode corresponds to a partially-automated hands-off driving mode or a highly-automated or fully-automated hands-off driving mode, while in contrast the second driving mode corresponds to a partially-automated hands-on driving mode.

In this first example, it is advantageous if, in the first lighting state with active first driving modes (partially-automated hands-off driving mode or highly-automated or fully-automated hands-off driving mode), the steering wheel rim lights up as a closed light ring, while in contrast with active second driving mode (partially-automated hands-on driving mode), in the second lighting state, the steering wheel rim only lights up on a left curved region and on a right curved region of the steering wheel rim to signal that the driver is to keep his hands on these curved regions of the steering wheel rim. This can take place independently of whether the driver already has his hands on the steering wheel rim or not. Thus, a left and a right region of the steering wheel display light up, at which the driver has to place the hands. It can also be provided that, in the first driving mode, the steering wheel rim does not light up as a closed light ring, but rather only in larger curved regions (in comparison to the second driving mode) of the steering wheel rim, which comprise the left and right curved regions and extend significantly beyond them. For example, in the first driving mode, the steering wheel rim lights up completely except for an omitted top and/or bottom curved region of the steering wheel rim. It would also be conceivable that a certain curved region is omitted on the left and right, for example in the region of the steering wheel spokes.

The driver keeps his hands intuitively on the lighted partial regions on the left and right on the steering wheel rim when the vehicle is operated in the partially-automated hands-on driving mode and only a left and a right lighted region of the steering wheel display light up.

In principle, however, it would also be conceivable that the first lighting state is associated with an arbitrary one of the three driving states and the second lighting state having the two curved regions is associated with another of the three driving states.

If the two driving modes to be differentiated are the partially-automated hands-off driving mode and the partially-automated hands-on driving mode, in addition to the change of the display area, a color change can also be provided between the two driving modes (for example, green in the case of partially-automated hands-off driving mode and yellow in the case of partially-automated hands-on driving mode).

A segmented light ring can be integrated into the steering wheel rim for this purpose as the lighting means, for example, which lights up alternately in all segments or in only a subset of the segments in a right and left region of the steering wheel rim. The light color of the light ring can preferably also be changed.

If the first driving mode is the partially-automated hands-off driving mode and the second driving mode is the partially-automated hands-on driving mode, the driving system preferably switches over automatically from the partially-automated hands-off driving mode into the partially-automated hands-on driving mode (for example, upon recognition of a critical driving situation, for example in the case of an obstacle). It can also be that the driving system can also automatically switch over again from the hands-on driving mode into the hands-off driving mode (for example, after the critical driving situation).

An operating element is preferably provided, by means of which the driver selects a partially-automated driving operation; the selection of the hands-off driving mode or hands-on driving mode is preferably taken over by the vehicle, however.

In a further example of the invention, the first driving mode is the highly-automated or fully-automated hands-off driving mode, while in contrast the second driving mode is the partially-automated hands-off driving mode or the partially-automated hands-on driving mode.

In this case, it is advantageous when, with active highly-automated or fully-automated driving mode, the steering wheel display lights up in the first lighting state having a first light color (for example, in blue), while in contrast, with active partially-automated driving mode, the light display lights up in the second lighting state in a second light color differentiable by the driver from the first light color (for example, in green). The light color in the second lighting state can depend in the case of a partially-automated hands-on driving mode on whether the driver presently has the hands on the steering wheel or not (for example, green upon touching of the steering wheel and yellow upon non-touching of the steering wheel).

In this way, the driver can easily differentiate whether a highly-automated or fully-automated driving mode or only a partially-automated driving mode is present. This differentiation is important in particular against the background that, in the highly-automated or fully-automated driving mode, the driver does not have to continuously monitor the automated driving operation, while in contrast, in the partially-automated driving operation, this continuous monitoring of the automated driving operation has to be ensured. The driver is notified of the different requirement profile of the driver-side monitoring by the different colors.

In addition to the differentiation via the color, it can be provided that, in the second lighting state (partially-automated driving mode), the steering wheel rim only lights up on a left curved region and on a right curved region of the steering wheel rim, while in contrast, in the first lighting state (highly-automated or fully-automated driving mode), the steering wheel rim lights up as a closed light ring or at least in larger curved regions (in comparison to the left and right curved regions) of the steering wheel rim, which comprise the left and right curved regions and go beyond them.

Independently of the above-described signaling of the driving mode, the steering wheel display can also be used for a hands-on request. A driving mode assisted by the driving system is a partially-automated hands-on driving mode; this can correspond, for example, to the second driving mode.

The driving system comprises, for the implementation of the hands-on request, a hands-on detection unit for recognizing the hand application to the steering wheel, in particular to the steering wheel rim. For example, a capacitive or resistive hands-on sensor system can be integrated into the steering wheel rim for this purpose, which establishes touching of the steering wheel rim. The hands-on sensor system can cover the entire circumference or only a part of the circumference of the steering wheel rim. Preferably, touching the steering wheel rim using only a single hand at a point detectable using the sensor system is already sufficient for recognizing the hand application.

The driving system is preferably configured, during operation of the vehicle in the partially-automated hands-on driving mode, to output a hands-on request to the driver to request the hands be placed on the steering wheel, if the hands-on detection unit does not recognize hand application on the steering wheel. It is to be noted that a hands-on request in the partially-automated hands-on driving mode is to be differentiated from a takeover request in the highly-automated driving mode: In the case of a hands-on request, the driver is requested to place the hands on the steering wheel, without the driver actually having to steer (the driving system does this for the driver). The driver can then rapidly intervene, however, if the situation requires it. In the case of a takeover request, the driver is requested not only to place the hands on the steering wheel, but rather to take over the steering of the vehicle and in general also the longitudinal control of the vehicle.

The above-described hands-on request comprises a change of the lighting state of the steering wheel display from one lighting state (for example, the above second lighting state) into a different lighting state differentiable by the driver from this lighting state.

By changing the lighting state of the steering wheel display, the driver can be intuitively requested to place the hands on the steering wheel.

The change of the lighting state is expressed, for example, in a change of the light color, for example a change to a signal color (for example, from green or blue to red). For example—as described above—in the partially-automated hands-on driving mode only a left and a right region of the steering wheel rim are illuminated, on which the driver is to keep the hands. In the scope of the hands-on request, the color preferably changes from green or blue to red.

In the scope of the change of the lighting state, the one lighting state preferably continuously merges into the other lighting state. For example, the one lighting state merges within a defined time span (for example a time span in the range of 3 seconds to 12 seconds, for example 6 seconds), after establishing that the hands are not applied to the steering wheel, into the other lighting state.

The continuous transition can be designed, for example, so that, in the scope of the change of the lighting state, the region or regions of the steering wheel display firstly lighting up in a specific light color are continuously filled up with another light color (for example, like an hourglass).

Independently of the above-described signaling of the driving mode, the steering wheel display can also be used to display whether the driver has the hands on the steering wheel or not in the partially-automated hands-on driving mode.

In this case, the driving system comprises a hands-on detection unit for recognizing the hand application to the steering wheel, in particular to the steering wheel rim. The driving system is configured, upon operation of the vehicle in the partially-automated hands-on driving mode and with established hand application to the steering wheel, in particular to the steering wheel rim, to cause the steering wheel display to light up in a defined lighting state, and, without hand application to the steering wheel, in particular to the steering wheel rim, to cause the steering wheel display to light up in a different lighting state differentiable by the driver from the defined lighting state. For example, the two lighting states differ in the light color thereof. For example, the steering wheel display lights up in the partially-automated hands-on driving mode, for example in a first color (for example, green), when at least one hand grasps the steering wheel rim at an arbitrary point, while in contrast the steering wheel display lights up in a second color (for example, orange), when no hand grasps the steering wheel rim at an arbitrary point. Preferably, the entire steering wheel rim does not light up in both cases, but rather only on a left curved region and on a right curved region of the steering wheel rim to signal that the driver is supposed to keep his hands on these curved regions of the steering wheel rim.

A warning escalation can optionally also be provided here. In this case, the display can change in color over time if the driver does not grasp the steering wheel rim at an arbitrary point with at least one hand within a defined time window (for example, 8 seconds). For example, the second color (for example, orange) can merge continuously into a third color, for example by the lighted display regions being continuously filled up by the third light color (for example, like an hourglass).

It can be provided that an operating element for activating a driving mode lights up in the same color as the steering wheel display:

For example, the first driving mode is the highly-automated or fully-automated hands-off driving mode, while in contrast the second driving mode is the partially-automated hands-off driving mode or the partially-automated hands-on driving mode. The driver assistance system comprises an operating element (for example, a button), which can be illuminated and which is arranged in particular on the steering wheel, for the driver-side selection of the first driving mode, and an operating element (for example, a button), which can be illuminated and which is arranged in particular on the steering wheel, for the driver-side selection of the second driving mode. The driving system is then preferably configured to cause both the steering wheel display and also the operating element associated with the first driving mode to light up in a common light color in the first driving mode, and to cause both the steering wheel display and also the operating element associated with the second driving mode to light up in a different common light color differentiable by the driver in the second driving mode.

For example, in the highly-automated or fully-automated hands-off driving mode, both the operating element for the highly-automated or fully-automated hands-on driving mode and also the steering wheel display light up in blue, while in contrast, in the partially-automated hands-on driving mode, both the operating element for the partially-automated hands-on driving mode and also the steering wheel display light up in green. If the color of the steering wheel display changes in the partially-automated hands-on driving mode (for example, to yellow or red), the color of the operating element for selecting the partially-automated hands-on driving mode preferably also changes into the same color.

A further aspect of the application relates to a display method for a driving system for automated driving of a motor vehicle. The driving system is operable at least in a first automated driving mode having automated longitudinal and/or lateral control and in a second automated driving mode different therefrom having automated longitudinal and/or lateral control, wherein the first and the second driving mode preferably correspond to two different driving modes from the above-discussed group of three driving modes. The driving system comprises a steering wheel display having lighting means for lighting up the steering wheel, wherein the steering wheel display is operable in various lighting states differentiable by the driver. According to the display method, upon operation of the driving system in the first driving mode, the steering wheel display lights up in a first lighting state, while in contrast, upon operation of the driving system in the second driving mode, the steering wheel display lights up in a second lighting state differentiable by the driver from the first lighting state.

The above statements on the driving system according to the invention also apply correspondingly to the display method. Advantageous exemplary embodiments of the display method according to the invention which are not explicitly described at this point and in the patent claims correspond to the advantageous exemplary embodiments of the driving system according to the invention described above or described in the patent claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
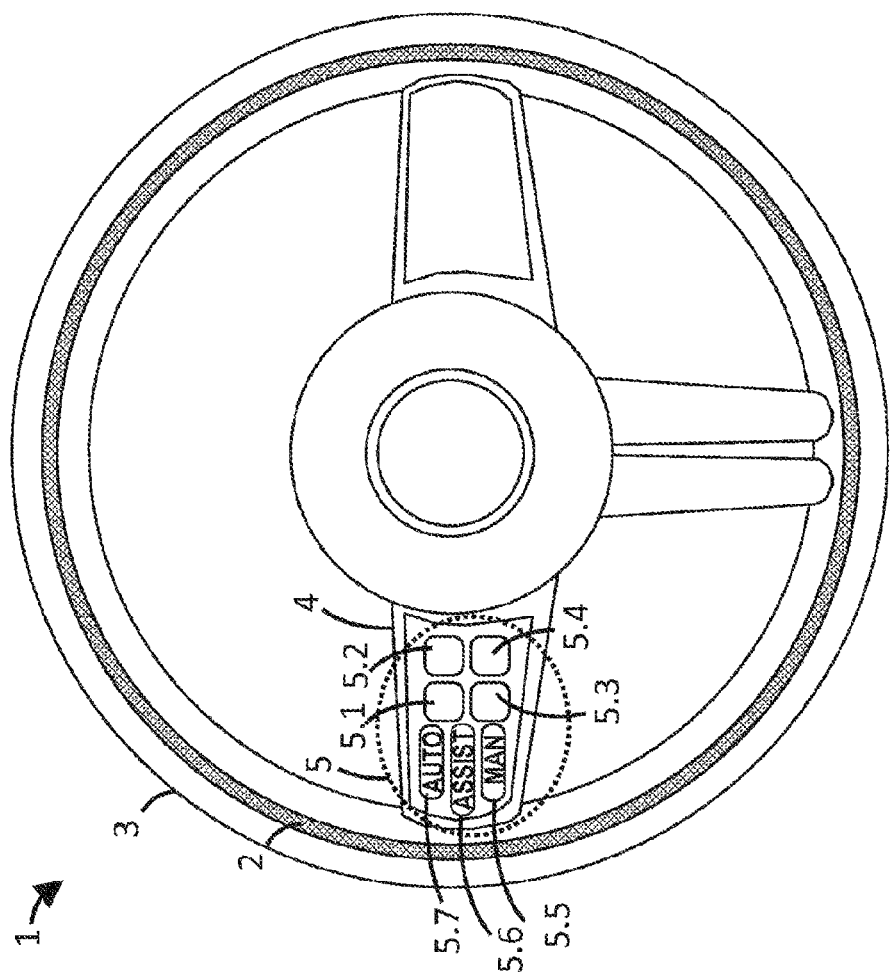
FIG. 1 shows an exemplary steering wheel comprising an exemplary steering wheel display and exemplary operating elements for a driving system according to the invention for automated driving.

FIG. 1 shows an exemplary steering wheel 1 comprising an exemplary steering wheel display 2 integrated into a steering wheel rim 3 and comprising exemplary combined display and operating elements 5 integrated into a steering wheel spoke 4 for a driving system according to the invention for automated driving. The steering wheel display 2 is implemented in the form of a segmented light ring comprising a plurality of light segments, which can be caused to light up in dependence on the activation alternately as a closed light ring or only in defined curved regions of the light ring. In this case, the light ring can light up in different light colors in dependence on the system-side activation. To implement the individual segments of the light ring, for example, lighting devices in the form of LEDs (LED—light-emitting diode) can be provided. A segment of the light ring can correspond in this case to a group of LEDs or to a single LED.

Furthermore, a hands-on detection unit comprising a sensor system integrated into the steering wheel rim is provided, which can establish whether the driver keeps at least one hand on the steering wheel in the curved region of the steering wheel rim 3 which is covered by the sensor system. In this case, the entire steering wheel rim 3 can be covered by the sensor system or one or more regions of the steering wheel rim 3 can be omitted in this case (for example, the region at the bottom and/or top on the steering wheel rim 3).

The combined display and operating elements 5 comprise a plurality of operating panels 5.1-5.7, wherein a single operating panel is actuated by pressing or touching. The combined display and operating elements 5.1-5.4 are preferably dependent in the function and display thereof on the respective active driving mode. In dependence on the driving mode, these operating panels 5.1-5.4 can be covered by a variable symbolic or text inscription dependent on the driving mode.

The combined display and operating elements 5.5, 5.6, 5.7 having the exemplary inscription "MAN", "ASSIST", and "AUTO" are each used for the driver-side selection of a respective assigned driving mode and are backlit in color, for example, when the driving mode associated with the operating element is active, in order to signal the active driving mode to the driver.

The driving system assists a variety of driving modes:
1. Manual driving mode (manual driving): In the manual driving mode, both the longitudinal and also the lateral control are performed manually by the driver. By actuating the operating element 5.5 ("MAN"), the manual driving mode can be selected by the driver. With active manual driving mode, the operating element 5.5 ("MAN") is backlit in color to indicate the active driving mode.

2. Assisted driving mode (assisted driving): In the assisted driving mode, the driving system carries out the longitudinal control. The function of the driving system in this driving mode preferably corresponds to the function of an ACC system (ACC—adaptive cruise control). The lateral control is taken over by the driver. The driver has to continuously monitor the driving system. By actuating the operating element 5.6 ("ASSIST"), the driver can select the assisted driving mode. With active assisted driving mode, the operating element 5.6 ("ASSIST") is backlit in color to indicate the active driving mode. The driver can increase or decrease a target distance in relation to the front vehicle by way of the operating elements 5.1 and 5.3. For this purpose, they are provided with corresponding display information in this driving mode.

3. Partially-automated hands-on driving mode (partially-automated driving, abbreviated "TAF-HON"): In the partially-automated hands-on driving mode, the driving system takes over both the longitudinal and also the lateral control. In this driving mode, the driver both has to continuously monitor the system and also keep at least one hand on the steering wheel. If the assisted driving mode has been selected by actuating the operating element 5.6 ("ASSIST"), a partially-automated driving mode can be selected by actuating the operating element 5.4. The driving system establishes independently whether a partially-automated hands-off driving mode or a partially-automated hands-on driving mode is provided.

4. Partially-automated hands-off driving mode (partially-automated driving, abbreviated "TAF-HOF"): This differs from the partially-automated hands-on driving mode in that the driver does not have to keep a hand on the steering wheel. The system is preferably designed so that the driver can keep the hands on the steering wheel in the partially-automated hands-off driving mode if he wishes to (without him having to do this, however).

5. Highly-automated hands-off driving mode (highly-automated driving, abbreviated HAF): In the highly-automated hands-off driving mode, the driving system takes over the longitudinal and lateral control (for example, when driving on the freeway). The driver does not have to continuously monitor the system and also does not have to keep a hand on the steering wheel. However, the driver has to be capable in a certain time of taking over the vehicle control after the vehicle has requested the driver to do so by way of a takeover request. By actuating the operating element 5.7 ("AUTO"), the driver can select the highly-automated driving mode. With active assisted driving mode, the operating element 5.7 ("AUTO") is backlit in color to display the active driving mode.

Figure 2:
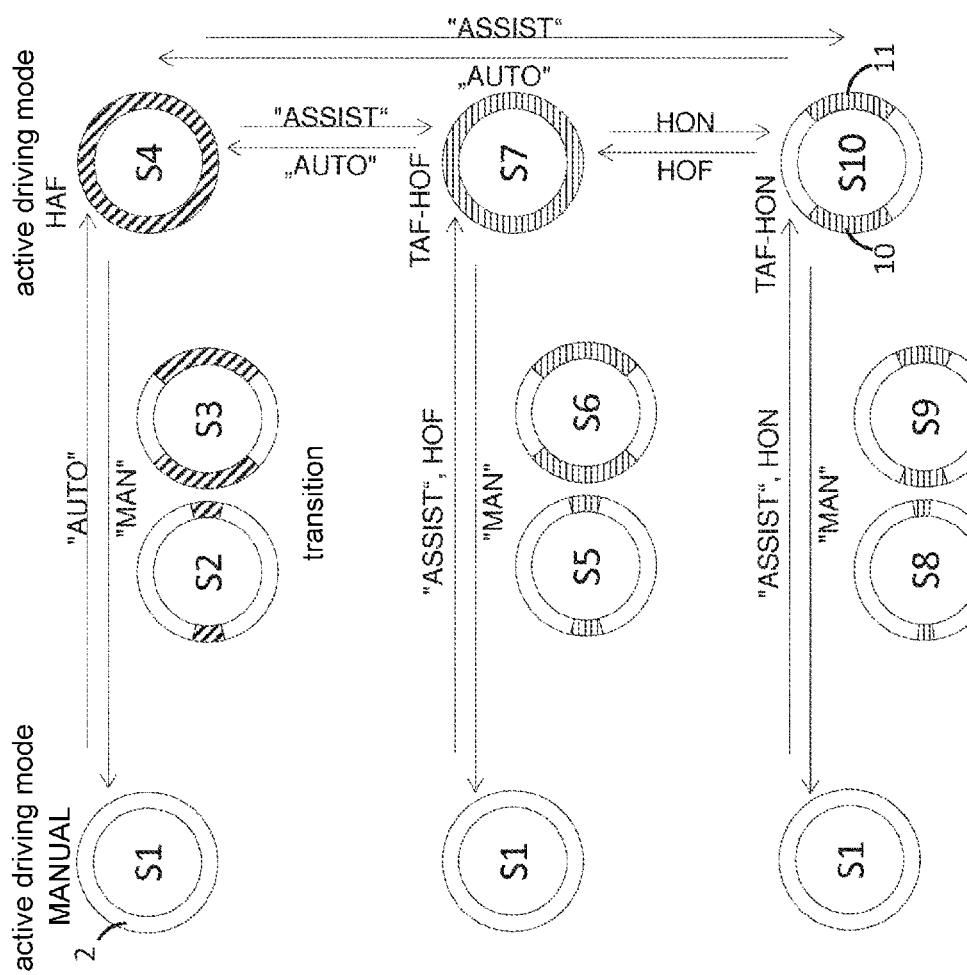
FIG. 2 shows different exemplary lighting states of a steering wheel display for various driving modes of an exemplary driving system for automated driving.

Various states S1-S10 of the steering wheel display 2 are schematically shown in dependence on the driving mode and the state transitions in FIG. 2. In this case, regions of the steering wheel display shown non-shaded indicate that these regions of the steering wheel display do not light up. If the entire steering wheel display 2 is not shaded, the entire display 2 does not light up. A region of the steering wheel display 2 shown with diagonal shading corresponds to a region which lights up in a first light color, for example blue. If the entire steering wheel display 2 is shown diagonally shaded, the entire display 2 lights up in the first light color, for example blue. A region of the steering wheel display 2 shown horizontally shaded corresponds to a region which lights up in a second light color, for example green. If the entire steering wheel display 2 is shown horizontally shaded, the entire display 2 lights up in the second light color, for example green.

If the vehicle is in the manual driving mode, the steering wheel display 2 is in the state S1 and does not light up. In reaction to an actuation of the operating element 5.7 ("AUTO"), the vehicle is switched over from the manual driving mode into the highly-automated hands-off driving mode HAF. If the driving mode HAF is active and has taken over the lateral and longitudinal control of the vehicle, the steering wheel display 2 is in the state S4, in which the steering wheel display 2 lights up as a closed light ring in the first light color (for example, blue).

The transition into the driving mode HAF can take place with a dynamic animation. After actuation of the operating element 5.7 ("AUTO") in the manual driving mode, firstly the intermediate states S2, S3 and possibly further intermediate states (not shown) follow, in which the illumination of the steering wheel display in the first light color (for example, blue) successively increases proceeding from a left and right region of the steering wheel display 2, until the entire light ring lights up in the state S4. In the state S4, the operating element 5.7 ("AUTO") lights up in the same light color as the steering wheel display 2.

If the vehicle is in the manual driving mode, in reaction to an actuation of the operating element 5.7 ("AUTO"), the vehicle can be switched over from the manual driving mode into a partially-automated driving mode. It can be provided that, in reaction to the actuation of the operating element 5.7 ("AUTO"), the vehicle firstly switches over into the assisted driving mode and the vehicle only switches over into a partially-automated driving mode after actuation of a further operating element (for example, the operating element 5.4). The operating element 5.4 is used in this case for activating an automated lateral control. At least the following different variants are contemplated:

1. The system always starts, upon actuation of the operating element 5.6 ("ASSIST"), with automated lateral control (i.e., in a partially-automated driving mode); to deactivate the lateral control (and switch over into the assisted driving mode), for example, the operating element 5.4 has to be pressed.
2. The system always starts, upon actuation of the operating element 5.6 ("ASSIST"), without automated lateral control (i.e., in the assisted driving mode); to activate the lateral control, a further operating element (for example, the operating element 5.4) has to be actuated.
3. The system notes the last set lateral control status (automated lateral control on or off) and starts again in this status after actuation of the operating element 5.6 ("ASSIST").

If a partially-automated driving mode has been selected by the driver by way of one or more operating actions, the vehicle decides automatically, for example in dependence on the present surroundings situation, whether the vehicle is operated in the partially-automated hands-off driving mode TAF-HOF or in the partially-automated hands-on driving mode TAF-HON. The system-side decision for the partially-automated hands-off driving mode TAF-HOF is identified in FIG. 2 with "HOF", while the system-side decision for the partially-automated hands-on driving mode TAF-HON is identified in FIG. 2 with "HON".

If the driving mode TAF-HOF has been activated and the automated lateral and longitudinal control of the vehicle has been taken over, the steering wheel display 2 is in the state S7, in which the steering wheel display 2 lights up as a closed light ring in the second light color (for example, green). The transition into the driving mode TAF-HOF can take place with a dynamic animation. After actuation of the operating element 5.7 ("ASSIST"), the intermediate states S5, S6 and possibly further intermediate states (not shown) follow, in which the illumination of the steering wheel display 2 in the second light color (for example, green) successively increases proceeding from a left and right region of the steering wheel display 2 until the entire light ring lights up in the state S7. In the state S7, the operating element 5.6 ("ASSIST") lights up in the same light color as the steering wheel display 2. Moreover, it can be provided that the operating element 5.4 also lights up in the same light color in the state S7.

It would also be conceivable that the light ring is not completely closed in the state S7, but rather, solely in comparison to the state S10 discussed hereafter, lights up in larger curved regions of the steering wheel rim 3, which comprise the left curved region 10 and the right curved region 11 and extend significantly beyond them. For example, in the state S7, the steering wheel rim 3 lights up completely except for an omitted top and/or bottom curved region. This would also be transferable in the same manner to the state S4 and the state S15 discussed hereafter.

If the driving mode TAF-HON was activated and the automated lateral and longitudinal control of the vehicle was taken over, the steering wheel display 2 is in the state S10, in which the steering wheel display only lights up on a left curved region 10 and on a right curved region 11 of the steering wheel rim 1 to signal that the driver is to keep his hands on these curved regions 10, 11 of the steering wheel rim 3. The two curved regions 10, 11 preferably light up in the second light color (for example, green). However, it would also be conceivable that, in the state S10, a different light color (for example yellow) than the first and second light colors is used in general. Moreover, it could be provided that the lighted regions flash or pulse.

The transition into the driving mode TAF-HON can take place with a dynamic animation. After actuation of the operating element 5.7 ("ASSIST"), the intermediate states S8, S9 and possibly further intermediate states (not shown) follow, in which the illumination of the steering wheel display 2 in the second light color (for example, green) increases successively until the regions 10 and 11 light up in the state S10.

In the state S10, the operating element 5.6 ("ASSIST") lights up in the same light color as the steering wheel display 2. Moreover, it can be provided that the operating element 5.4 also lights up in the same light color in the state S10.

It would be conceivable in the driving mode TAF-HON to make the light color of the steering wheel display 2 dependent on whether the driver presently keeps the hands on the steering wheel 1 or not: If, for example, the vehicle is in the driving mode TAF-HON and the driver is supposed to keep the hands on the steering wheel 1, the curved regions 10, 11 of the display 2 light up, on which he is to place the hand, in the second light color (for example, green), if a hands-on sensor system establishes that at least one hand grasps the steering wheel rim 3 at an arbitrary point. If the vehicle is in the driving mode TAF-HON and the driver is supposed to keep the hands on the steering wheel 1, the curved regions 10, 11 of the display 2 light up, on which he is to place the hand, in the other light color (for example, yellow), if a hands-on sensor system establishes that no hand grasps the steering wheel rim 3 at an arbitrary point.

By actuating the operating element 5.5 ("MAN"), the driving mode can be switched over proceeding from the driving modes HAF, TAF-HOF, and TAF-HON into the manual driving mode, wherein then the steering wheel display 2 successively goes out with the described intermediate states in reverse sequence in relation to the activation of the automated driving mode. A transition into this stage can thus take place with a dynamic animation.

By actuating the operating element 5.7 ("AUTO"), it is possible to switch over from a partially-automated driving mode TAF-HOF or TAF-HON into the highly-automated driving mode HAF, while in contrast, in the highly-automated driving mode HAF, it is possible to switch over into a partially-automated driving mode by actuating the operating element 5.6 ("ASSIST"), wherein the steering wheel display 2 is switched over accordingly (to the state S4 or to the state S7 or S10, respectively). The transition can also be accompanied by intermediate lighting states here.

Furthermore, the driving system can switch over the driving mode automatically from one partially-automated driving mode into the other partially-automated driving mode. In this case, the steering wheel display 2 changes from the state 7 to the state 10 or from the state S10 to the state S7, respectively. The transition can also be accompanied by intermediate lighting states here.

Figure 3:
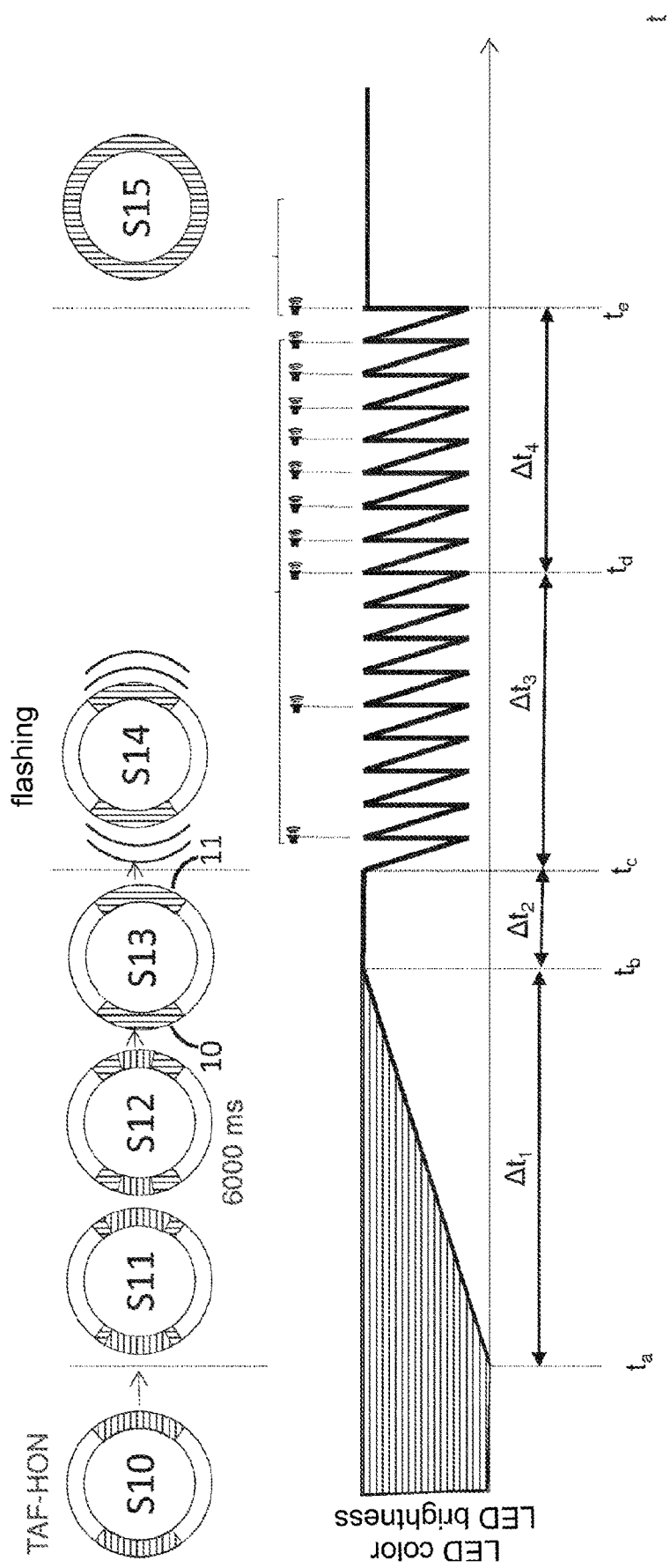
FIG. 3 shows an exemplary implementation of the signaling of a hands-on request in the partially-automated hands-on driving mode.

An exemplary implementation of the signaling of a hands-on request in the partially-automated hands-on driving mode TAF-HON will be described hereafter in conjunction with FIG. 3. The change of the color of the steering wheel display 2 and the brightness of the steering wheel display over the time tin the scope of the hands-on request is illustrated in the lower diagram.

When the hands-on detection unit establishes at the point in time $t_o$ that a hand is not applied to the steering wheel 1, the steering wheel display 2 begins proceeding from the state S10 to change the state in order to request the driver in the scope of a hands-on request to place the hands on the steering wheel. In this case, the lighting state S10 of the steering wheel display 2 merges continuously within a defined time span $\Delta t_1$ (for example, 6 seconds) via the illustrated intermediate states S11 and S12 into the state S13, in which the left and right illuminated regions 10 and 11 have a third light color (for example, red). The changed third light color (for example, red) corresponds in FIG. 3 to the vertically extending shading. During the transition into the state S13, the regions 10 and 11 are continuously filled up with the third light color (for example, red). The change of the lighting state S10 can begin immediately thereafter, if the hands-on detection unit establishes that a hand is not applied to the steering wheel. Alternatively, the change of the lighting state S10 can also only begin when the hands-on detection unit has established that the driver has no longer had a hand on the steering wheel for a defined duration (for example, 2 seconds), the driver has thus not grasped the steering wheel rim with at least one hand within this duration.

If the driver places at least one hand on the steering wheel rim 3 within the time span $\Delta t_1$ of the transition, the lighting state of the steering wheel display 2 preferably changes suddenly (i.e., without intermediate states) back into the lighting state S10.

After reaching the lighting state S13 at the point in time $t_b$, the lighting state is maintained for a duration $\Delta t_2$ (for example, $\Delta t_2$=2 seconds), if the driver has not applied a hand to the steering wheel rim 3 according to monitoring by the hands-on detection unit (otherwise jump back into the lighting state S10).

If the driver has still not applied a hand to the steering wheel after passage of the duration $\Delta t_2$, the lighting state S13 changes into the lighting state S14, in which the regions 10 and 11 flash in the third light color (for example, red).

In this state, acoustic warning signals are additionally output to the driver.

After the driver has not applied a hand to the steering wheel for a duration $\Delta t_3$ (for example, $\Delta t_3$=4 seconds) from the point in time $t_c$, it is communicated at the point in time $t_d$ via a display in the cockpit or in the head-up display that, if the hands-on request is not complied with, an emergency stopping maneuver will be carried out automatically by the driving system.

After the driver has not applied a hand to the steering wheel for a duration $\Delta t_4$ (for example, $\Delta t_4$=4 seconds) from the point in time $t_d$, an emergency stopping maneuver is triggered at the point in time $t_e$.

From this point in time $t_e$, the steering wheel display changes into the state S15, in which the lighted display 2 lights up as a closed light ring in the third light color (for example, red). The emergency stopping maneuver is now executed by the driving system.

Instead of an emergency stopping maneuver, it would also be conceivable that the driving system changes the automation state in reaction to noncompliance with the hands-on request and puts the vehicle, for example, into the manual driving operation having manual vehicle control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving system for automated driving for a motor vehicle, comprising:
    a steering wheel display, wherein, for the automated driving, the driving system is operable at least in one first driving mode having automated longitudinal and/or lateral control and in a second driving mode different therefrom having automated longitudinal and/or lateral control, wherein
    the steering wheel display comprises lighting for illuminating the steering wheel,
    the steering wheel display is operable in various lighting states differentiable by a driver,
    the driving system is configured to:
        specify which lighting state of the various lighting states the steering wheel display has,
        specify that, during operation of the driving system in the first driving mode, the steering wheel display illuminates in a first lighting state, and
        specify that, during operation of the driving system in the second driving mode, the steering wheel display illuminates in a second lighting state differentiable by the driver from the first lighting state,
    the first driving mode and the second driving mode have different degrees of automation,
    the lighting illuminates a rim of the steering wheel, and
    the driving system is configured such that:
        in the second lighting state, the steering wheel rim only illuminates on a left curved region and on a right curved region of the steering wheel rim, such that a top region of the steering wheel rim does not illuminate, and
        in the first lighting state, the steering wheel rim illuminates as a closed light ring or at least in larger curved regions of the steering wheel rim, which comprise the left and right curved region and extend beyond them,
    the first driving mode corresponds to a highly-automated or fully-automated hands-off driving mode having automated longitudinal and lateral control, in which the driver does not have to continuously monitor the system and also does not have to keep a hand on the steering wheel, and the second driving mode corresponds to a partially-automated hands-off driving mode having automated longitudinal and lateral control, in which the driver has to continuously monitor the system but does not have to keep a hand on the steering wheel.

2. The driving system according to claim 1, wherein the driving system is configured such that:

in the first lighting state, the steering wheel display illuminates in a first light color, and in the second lighting state, the steering wheel display illuminates in a second light color differentiable by the driver from the first light color.

3. The driving system according to claim 1, further comprising:

an operating element, which is illuminable and is arranged on the steering wheel for a driver-side selection of the first driving mode, and an operating element, which is illuminable and is arranged on the steering wheel for the driver-side selection of the second driving mode, and the driving system is configured to:

in the first driving mode, cause both the steering wheel display and also the operating element associated with the first driving mode to illuminate in a common light color, and in the second driving mode, cause both the steering wheel display and also the operating element associated with the second driving mode to illuminate in a different common light color differentiable by the driver.

4. A display method for a driving system for automated driving of a motor vehicle, wherein, for the automated driving, the driving system is operable at least in a first automated driving mode having automated longitudinal and/or lateral control and in a second automated driving mode different therefrom having automated longitudinal and/or lateral control, wherein the driving system comprises a steering wheel display having lighting for illuminating the steering wheel, the steering wheel display is operable in various lighting states differentiable by the driver, the display method comprises the steps of:

during operation of the driving system in the first driving mode, illuminating the steering wheel display in a first lighting state; and during operation of the driving system in the second driving mode, illuminating the steering wheel display in a second lighting state differentiable by a driver from the first lighting state, the first driving mode and the second driving mode have different degrees of automation, the lighting illuminates a rim of the steering wheel, and the driving system is configured such that:

in the second lighting state, the steering wheel rim only illuminates on a left curved region and on a right curved region of the steering wheel rim, such that a top region of the steering wheel rim does not illuminate, and in the first lighting state, the steering wheel rim illuminates as a closed light ring or at least in larger curved regions of the steering wheel rim, which comprise the left and right curved region and extend beyond them, the first driving mode corresponds to a highly-automated or fully-automated hands-off driving mode having automated longitudinal and lateral control, in which the driver does not have to continuously monitor the system and also does not have to keep a hand on the steering wheel, and the second driving mode corresponds to a partially-automated hands-off driving mode having automated longitudinal and lateral control, in which the driver has to continuously monitor the system but does not have to keep a hand on the steering wheel.

\* \* \* \* \*